(12) United States Patent
Birchette et al.

(10) Patent No.: US 9,708,057 B2
(45) Date of Patent: Jul. 18, 2017

(54) ACTIVE LANDING GEAR DAMPER

(71) Applicants: Terrence S. Birchette, Chandler, AZ (US); Akif O. Bolukbasi, Mesa, AZ (US)

(72) Inventors: Terrence S. Birchette, Chandler, AZ (US); Akif O. Bolukbasi, Mesa, AZ (US)

(73) Assignee: THE BOEING COMPANY, Chicago, IA (US)

( * ) Notice: Subject to any disclaimer, the term of this patent is extended or adjusted under 35 U.S.C. 154(b) by 129 days.

(21) Appl. No.: 14/188,589

(22) Filed: Feb. 24, 2014

(65) Prior Publication Data

US 2015/0239554 A1   Aug. 27, 2015

(51) Int. Cl.

| B64C 25/50 | (2006.01) |
|---|---|
| B64C 25/60 | (2006.01) |
| B64C 25/58 | (2006.01) |
| B64D 45/00 | (2006.01) |

(52) U.S. Cl.
CPC .............. *B64C 25/60* (2013.01); *B64C 25/58* (2013.01); *B64D 45/00* (2013.01)

(58) Field of Classification Search
None
See application file for complete search history.

(56) References Cited

U.S. PATENT DOCUMENTS

| 4,535,877 | A | * | 8/1985 | Shimokura | ............ | F16F 9/468 |
| | | | | | | 137/599.01 |
| 4,696,489 | A | | 9/1987 | Fujishiro et al. | | |
| 5,139,119 | A | * | 8/1992 | Karnopp | ............... | B60G 17/08 |
| | | | | | | 137/503 |
| 5,165,838 | A | * | 11/1992 | Kallansrude | ....... | B60G 17/0152 |
| | | | | | | 198/782 |
| 5,303,804 | A | * | 4/1994 | Spiess | ..................... | F16F 9/465 |
| | | | | | | 188/266.5 |
| 5,388,614 | A | * | 2/1995 | Hakamada | ............ | F16K 31/082 |
| | | | | | | 137/625.24 |
| 5,401,052 | A | | 3/1995 | Yoshioka et al. | | |
| 6,120,009 | A | * | 9/2000 | Gatehouse | .............. | B64C 25/60 |
| | | | | | | 267/64.11 |
| 6,389,341 | B1 | * | 5/2002 | Davis | ................ | B60G 17/0152 |
| | | | | | | 188/266.5 |

(Continued)

OTHER PUBLICATIONS

European Patent Office, European Search Report for EP15153229. 8, Jul. 16, 2015, 8 pages.

*Primary Examiner* — Richard G Davis
(74) *Attorney, Agent, or Firm* — Patterson + Sheridan, LLP

(57) ABSTRACT

An active landing gear damping system and method for decelerating a vehicle during a terrain impact event, such as an aircraft landing or crash. The system monitors aircraft state data and terrain information to predict an impact of the vehicle with the terrain. The system can then determine a target damper force for each landing gear of the vehicle and a predicted damper velocity at the time of impact. Each landing gear can include an adjustable damper valve, wherein adjustment of the damper valves varies the damping coefficient of the respective dampers. The system can adjust valves of the respective dampers to provide the target force based on the predicted damper velocity. After an impact begins, the system can continuously monitor and adjust the valve to maintain the target force.

21 Claims, 12 Drawing Sheets

(56) References Cited

U.S. PATENT DOCUMENTS

| | | | |
|---|---|---|---|
| 7,720,582 B2* | 5/2010 | Makinadjian | B64C 25/60 244/100 R |
| 8,991,840 B2* | 3/2015 | Zuleger | B60G 13/06 280/124.16 |
| 2006/0224285 A1 | 10/2006 | Izawa et al. | |
| 2011/0035118 A1* | 2/2011 | Hiemenz | B60N 2/4242 701/45 |
| 2013/0197755 A1* | 8/2013 | Otake | B60G 17/08 701/38 |

* cited by examiner

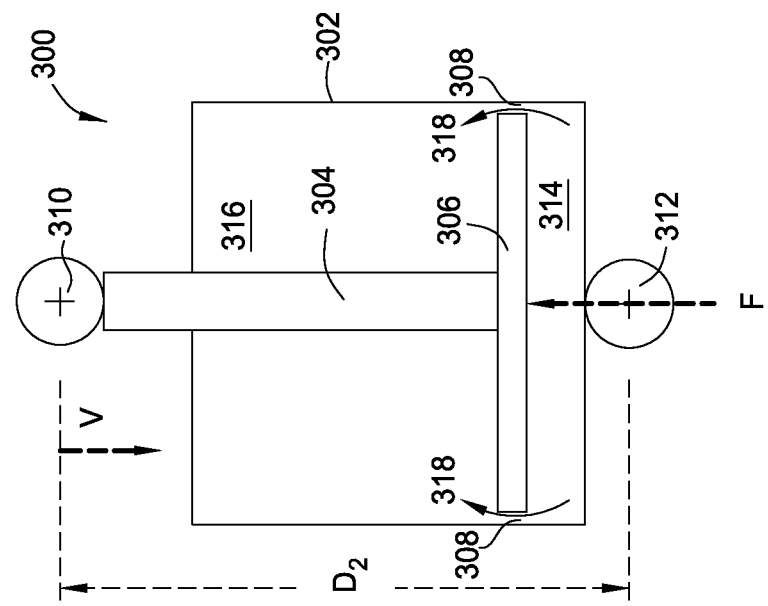
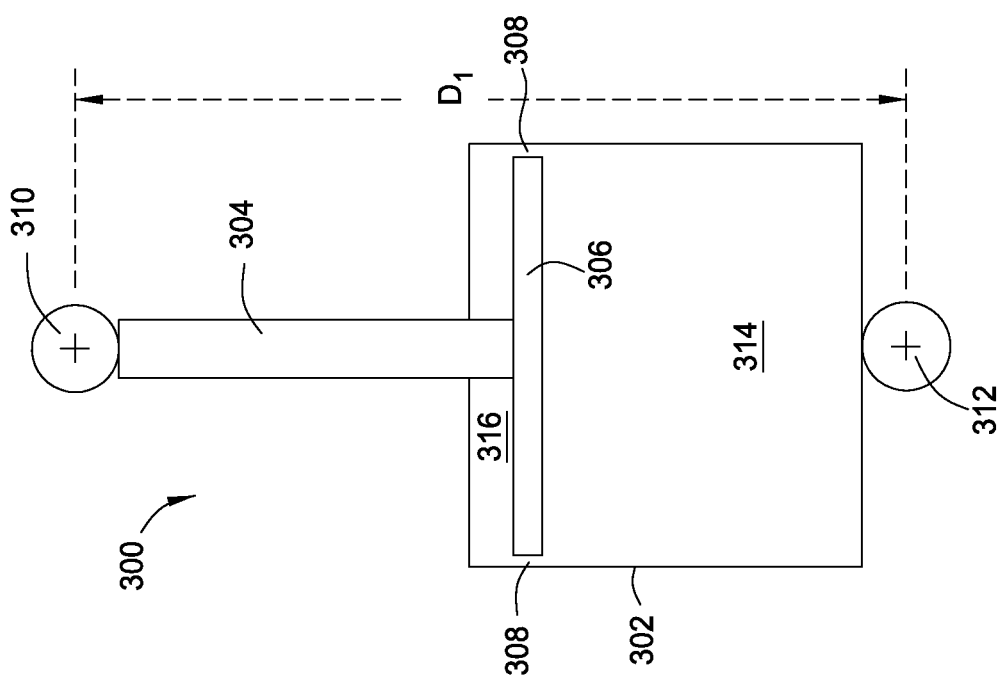

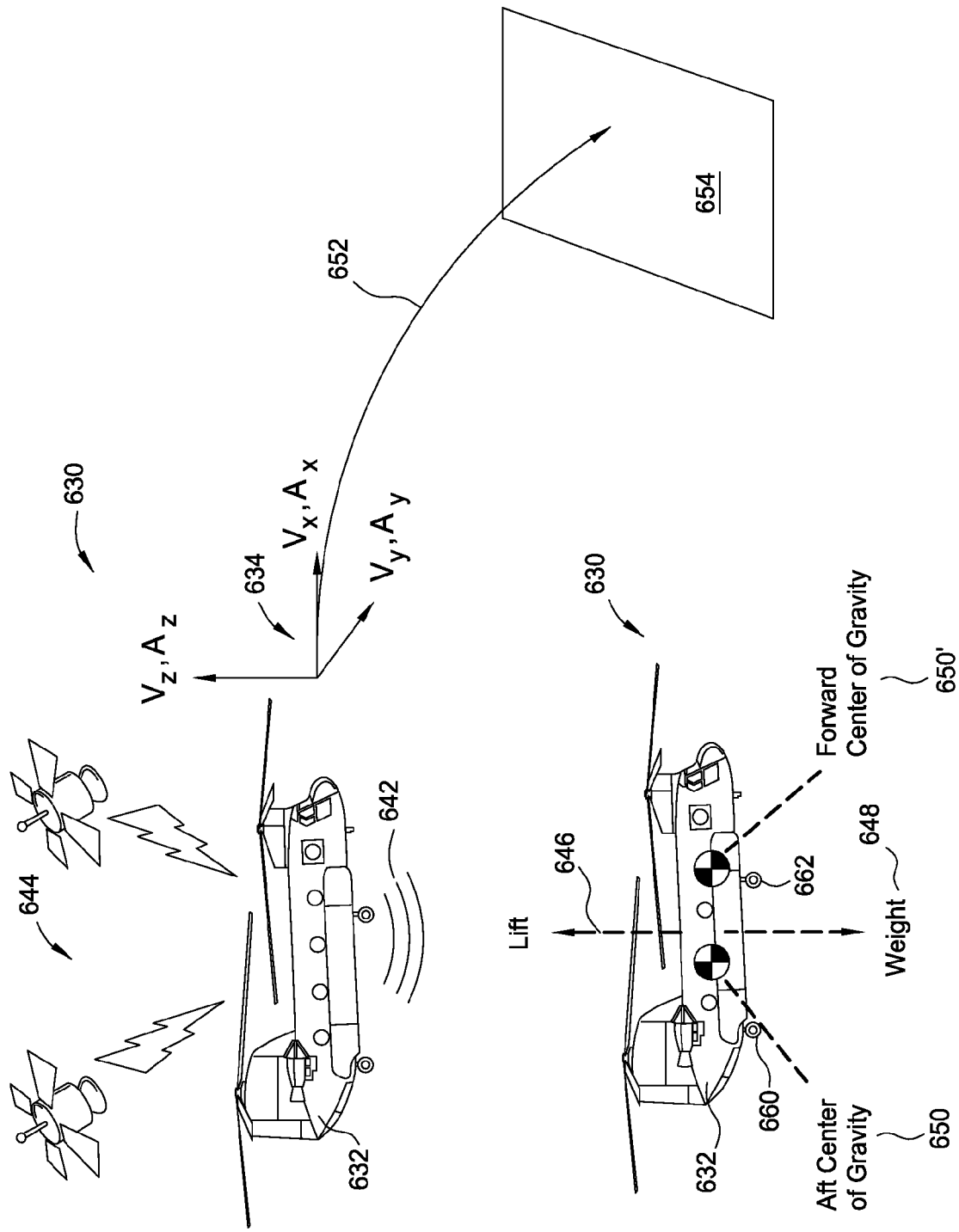

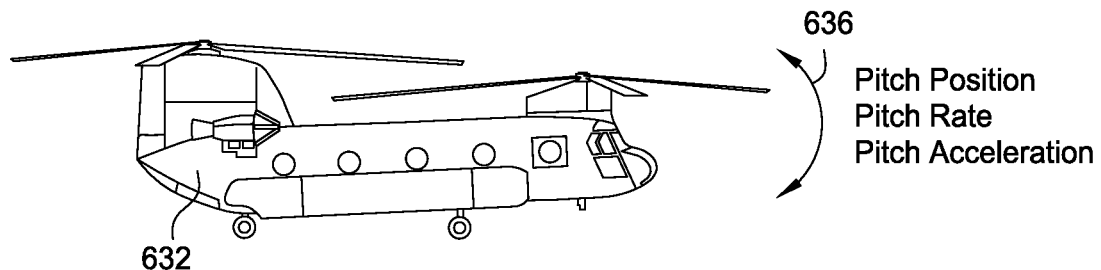
FIG. 6D
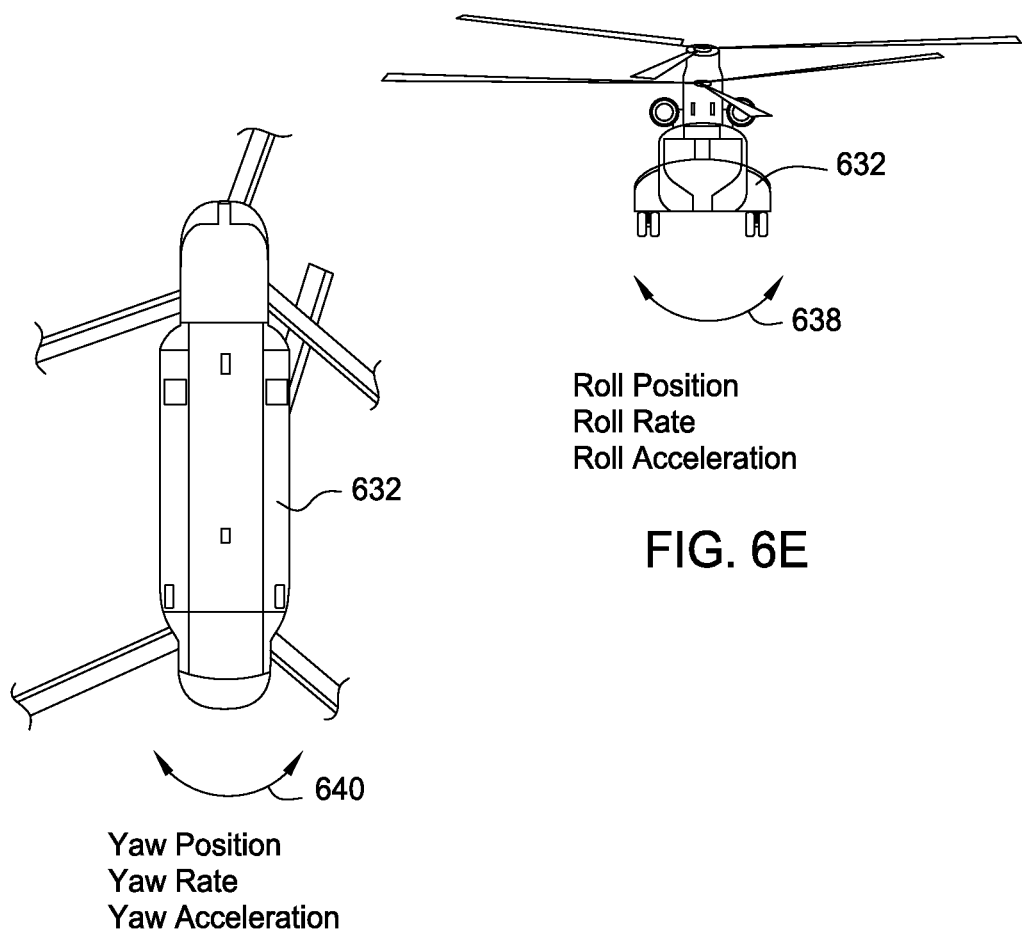
FIG. 6E
FIG. 6F

ACTIVE LANDING GEAR DAMPER

FEDERALLY-SPONSORED RESEARCH OR DEVELOPMENT

This invention was made with Government support under Contract Number W911W6-10-2-0003 awarded by the Department of Defense. The Government has certain rights in this invention.

BACKGROUND

In aircraft impact situations (e.g., landings or crashes), an aircraft's landing gear can absorb some energy of the impact. In crash situations, the landing gear can impact terrain first and slow down the airframe before the airframe subsequently impacts the terrain. Specifically, each landing gear can include a damper that resists rapid compression of the landing gear. This resistance can decelerate the airframe during an impact.

Current landing gear damping systems are passive and are designed to provide optimal deceleration in a crash impact for a specific aircraft gross weight and for a specific crash velocity. However, no two crashes are identical. Over the course of a flight, an aircraft's weight will decrease as it burns fuel and/or releases weapons/cargo. Also, in different circumstances, aircraft will impact terrain 106, at different velocities and/or attitudes. As a result, the aircraft's landing gear may not provide the optimum energy absorption capability to absorb the kinetic energy of the aircraft in a crash.

SUMMARY

Embodiments of a damper for a vehicle suspension system can include a continuously adjustable damper valve. Adjustment of the damper valve can change a damping coefficient of the damper. The damper can also include a motor that adjusts the damper valve. The damper can also include a controller. The controller can receive a target damper force and an initial damper velocity for an impact of the vehicle with terrain. In response to the received target damper force and initial damper velocity, the controller can operate the motor to adjust the damper valve to a position corresponding to a damping coefficient that results in the target damper force at the initial damper velocity. After an impact begins, the controller can operate the motor to reduce any difference between the target damper force and the actual damping force of the damper.

Embodiments of an aircraft can include avionics and/or computers that determine aircraft state data. The aircraft can also include a terrain database (e.g., a digital map) comprising terrain information. The aircraft can include a plurality of landing gear. Each landing gear can include an adjustable damper that provides a damping force that opposes motion of a portion of the landing gear relative to an airframe of the aircraft. Each adjustable damper can include a continuously adjustable damper valve. Adjustment of the damper valve can change a damping coefficient of the damper. Each damper can also include a motor that operates to adjust the damper valve. The aircraft can also include a controller. The controller can calculate, based on the aircraft state data and terrain information, target damper forces and initial damper velocities for each damper for an impact of the aircraft with terrain. The controller can then operate the motors of the dampers to adjust the respective damper valves to positions corresponding to damping coefficients that result in the target damper forces at the initial damper velocities. After an impact begins, the controller can operate each motor to reduce differences between the target damper forces and the actual damping forces of the respective dampers.

Embodiments of methods for damping an impact of a vehicle with terrain include predicting impact parameters of the vehicle. The vehicle can include terrain supports (e.g., landing gear, skids, floats, skis, and wheels), wherein each terrain support is coupled to the vehicle by a suspension component and wherein each suspension component includes an adjustable damper. Each adjustable damper can be adjusted to change a damping coefficient of the damper. Based on the predicted impact parameters, the method can include determining a target damper force and a predicted initial impact damper velocity for each damper. The method can that include adjusting each adjustable damper to achieve the respective target damper forces based on the respective initial impact velocities. After the impact has begun, the method can include adjusting the adjustable dampers to reduce differences between respective actual damping forces and the respective target damping forces.

BRIEF DESCRIPTION OF THE SEVERAL DRAWINGS

FIG. 3A illustrates a cross-sectional view of an exemplary damper in an extended position;

FIG. 3B is a cross-sectional view of the damper of FIG. 3A moving toward a contracted position;

FIG. 6B illustrates an exemplary helicopter in an exemplary environment, wherein various aircraft data used by the system of FIG. 6A is depicted;

FIG. 6C illustrates the exemplary helicopter with additional aircraft data used by the system of FIG. 6A depicted;

FIG. 6D illustrates the exemplary helicopter of FIG. 6C with aircraft pitch information used by the system of FIG. 6A depicted;

FIG. 6E illustrates the exemplary helicopter of FIG. 6C with aircraft roll information used by the system of FIG. 6A depicted;

FIG. 6F illustrates the exemplary helicopter of FIG. 6C with aircraft yaw information used by the system of FIG. 6A depicted;

DETAILED DESCRIPTION

Figure 1A:
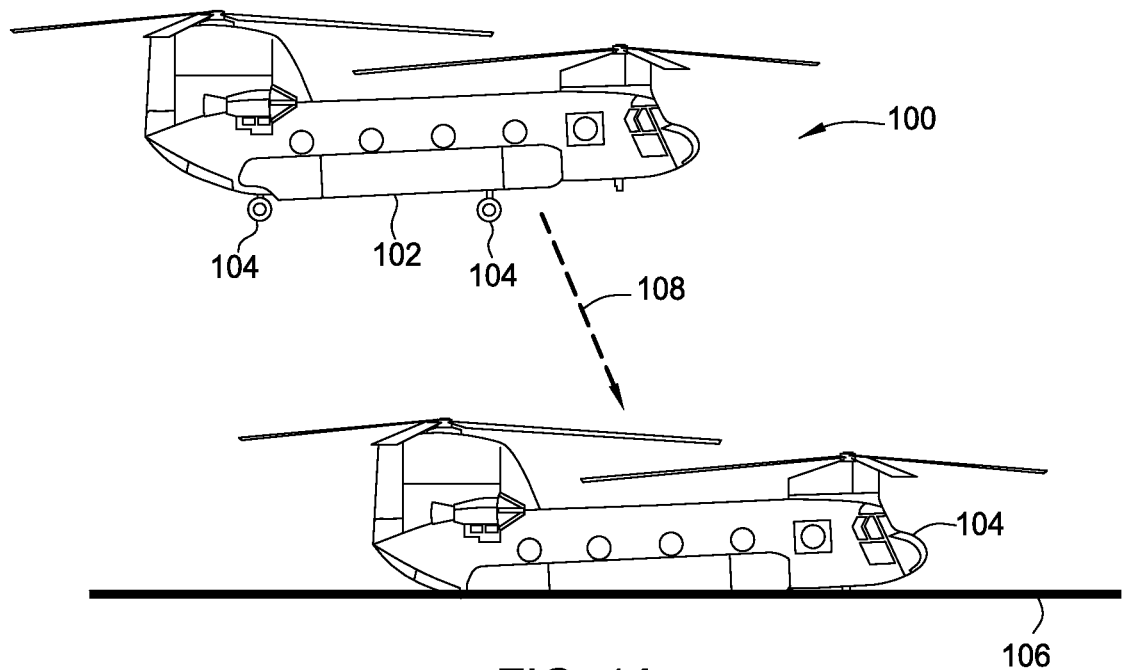
FIG. 1A illustrates an exemplary scenario in which a helicopter crashes into terrain.
Figure 1B:
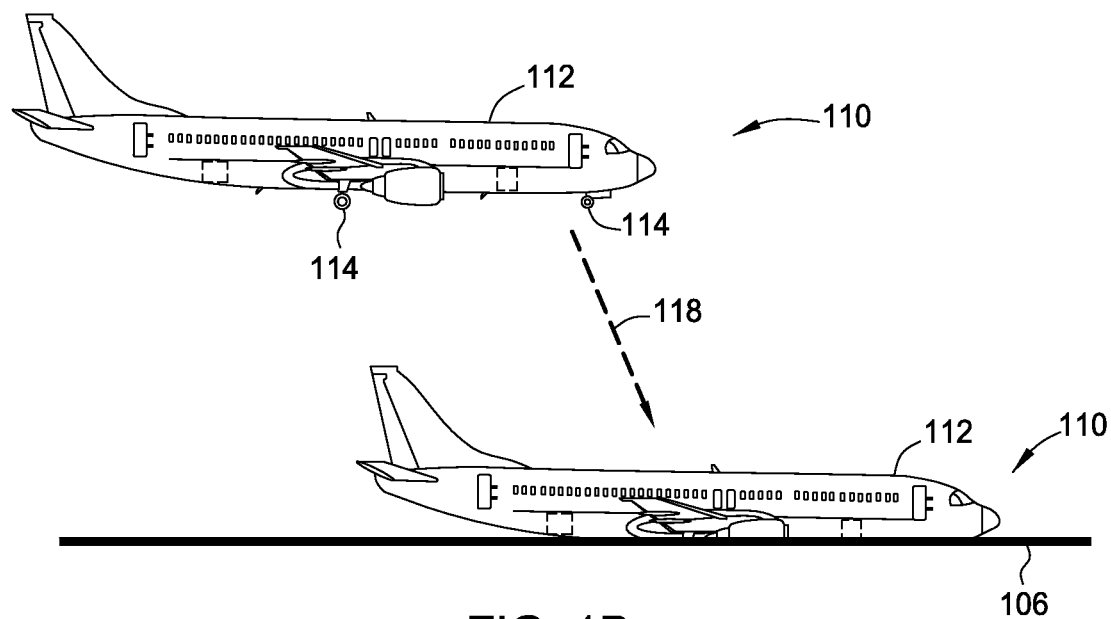
FIG. 1B illustrates an exemplary scenario in which a fixed-wing aircraft crashes into terrain.

As described above, in aircraft impact events such as landings and crash events, an aircraft's landing gear can absorb some or all of the impact energy. Specifically, referring to FIG. 1A, in a crash event 100, the landing gear 104 of an aircraft 102 can absorb some kinetic energy 108 of the aircraft 102 when the aircraft 102 impacts terrain 106. FIG. 1A illustrates a helicopter (i.e., an aircraft 102) before and after impacting terrain 106. Upon impact, the landing gear 104 can compress and/or collapse, thereby absorbing some energy of the crash to minimize the amount of energy to be absorbed by the remainder of the aircraft system. FIG. 1B illustrates a fixed-wing aircraft 112 before and after impacting the terrain 106. The landing gear 114 of the fixed wing aircraft 112 can absorb some kinetic energy 118 of the aircraft 112 before the remainder of the aircraft 112 impacts terrain 106.

Passive landing gear systems are designed to provide optimal deceleration during a crash for a specific aircraft gross weight and for a specific crash velocity. However, no two crashes are identical. Over the course of a flight, an aircraft's weight will decrease as it burns fuel and/or releases weapons/cargo. Also, in different circumstances, aircraft will impact terrain 106, at different velocities and/or attitudes. As a result, the landing gear of an aircraft may not provide the optimal energy absorption capability to absorb the kinetic energy 108 of the aircraft. Embodiments of landing gear described herein incorporate an adjustable damper that can vary a damping rate of landing gear to account for variations in aircraft weight, attitude, and impact velocity, among other factors, to maximize the energy absorption of the landing gear.

Figure 2:
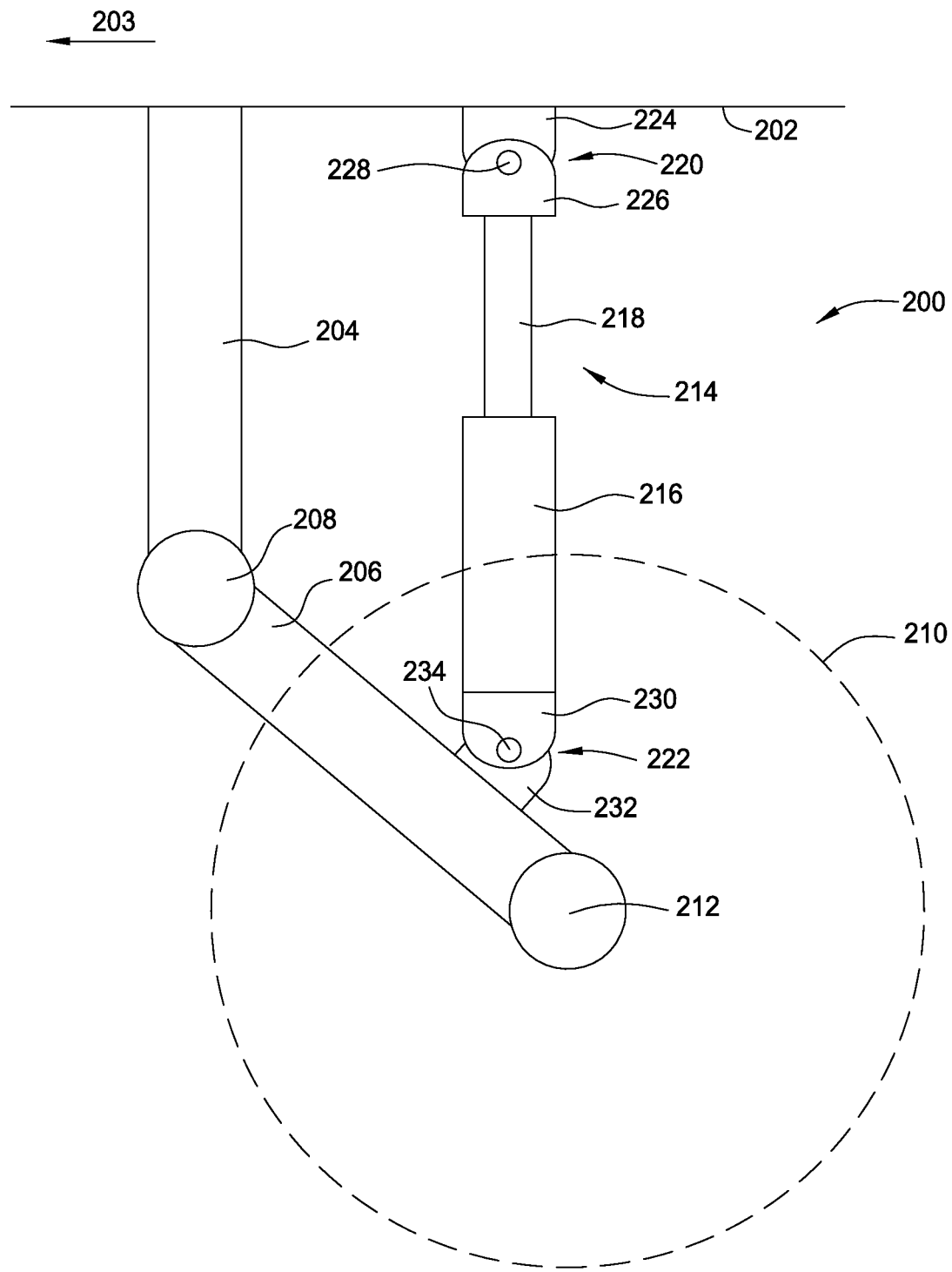
FIG. 2 illustrates an exemplary trailing-link type of landing gear.

Referring now to FIG. 2, an exemplary aircraft landing gear structure 200 is shown. The landing gear structure 200 depicted is a trailing link landing gear arrangement. The trailing link landing gear includes a first link 204 that can be connected to and/or coupled to the aircraft frame 202 of an aircraft. A second link 206 can be connected to and/or coupled to the first link 204 by a pivot 208. The second link 206 can trail behind the first link 204 (as indicated by arrow 203 that illustrates the forward direction of the aircraft). An aircraft tire 210 (shown in hidden lines) can be connected to a distal end of the second link 206 via an axle 212. When the aircraft tire 210 impacts terrain 106, the tire 210 and axle 212 can move toward the aircraft frame 202 as the second link 206 rotates about the pivot 208. A damper 214 can be arranged between and connected to the second link 206 and the aircraft frame 202. The damper 214 can provide a damping force that resists relative movement between the second link 206 and the aircraft frame 202. The damper 214 can be connected to the aircraft frame 202 by a first pivot joint 220 and is connected to the second link 206 by a second pivot joint 222. The first pivot joint 220 and second pivot joint 222 enable the damper 214 to pivot relative to the aircraft frame 202 and the second link 206.

Landing gear configurations other than trailing link landing gear can also incorporate embodiments of dampers described below. Furthermore, landing gear that incorporate dampers described below do not necessarily require wheels. For example, landing gear incorporating dampers described below can use skids, skis, and/or floats in place of wheels.

Referring now to FIGS. 3A and 3B, a damper 300 resists motion by restricting flow of a fluid out of a first volume 314. FIG. 3A shows a damper 300 in a fully extended position wherein the upper mount 310 and the lower mount 312 are separated by a distance D1. FIG. 3B shows the damper 300 in a fully compressed position where the upper mount 310 and the lower mount 312 are separated by a smaller distance D2. The damper 300 can include a cylinder 302 with a piston 306 arranged therein. A shaft 304 can be attached to the piston 306. One mount 310 can be connected to the shaft 304 and the other mount 312 can be connected to the cylinder 302. The cylinder 302 and the piston 306 can define a first volume 314 and a second volume. The piston 306 can include at least one opening 308 through which fluid in the first volume 314 can pass to the second volume 316. FIGS. 3A and 3B illustrate the opening 308 as a gap between walls of the cylinder 302 and an outer diameter of the piston 306. However, the opening 308 can also be an aperture or apertures in the piston 306 or a passage leading out of the first volume 314 (e.g., to an exterior reservoir). As the piston 306 moves downward from the position shown in FIG. 3A to the position shown in FIG. 3B, fluid can flow through the opening 308 from the first volume 314 (as indicated by arrows 318) to the second volume 316. The opening 308 provides resistance to the flow of the fluid. The smaller the opening 308 is, the more resistance there is to the flow of fluid out of the first volume 314. The amount of force F required to move the piston 306 downwardly is proportional to the square of the velocity with which the piston 306 moves. Put differently, more force F is required to move the piston 306 at a fast velocity v than at a slow velocity. The force required to move an ideal piston is given by the equation:

$$F = c \cdot v^2; \qquad (1)$$

where F is the force required, v is the velocity at which the piston is moving relative to the cylinder, and c is a damping coefficient. The damping coefficient c is a function of a viscosity of the fluid and also the size of the opening(s) 308. The damping coefficient c increases as the fluid gets more viscous. Also, the damping coefficient c increases as the opening(s) 308 decrease in size (i.e., become more restrictive to the fluid flowing there through).

In FIGS. 3A and 3B, the lower mount 312 is shown to be stationary such that only the upper mount 310 is moving. In a landing gear system however, both the upper mount 310 and the lower mount 312 can be moving. Referring again to FIG. 2, when the landing gear structure 200 contacts the terrain 106, the lower pivot joint 222 of the damper 214 can move downwardly toward the terrain 106 as the second link 206 rotates about pivot 208. The lower pivot joint 222 of the damper 214 can also move downwardly if the aircraft tire 210 compresses upon impact with the terrain and/or if the tire 210 sinks into the terrain 106 (e.g., if the terrain 106 is sand or marsh). In such instances where both the upper mount 310 in the lower mount 312 can be moving, again, it is the relative velocity between the upper mount 310 and lower mount 312 that determines the resulting damping force F.

Figure 4A:
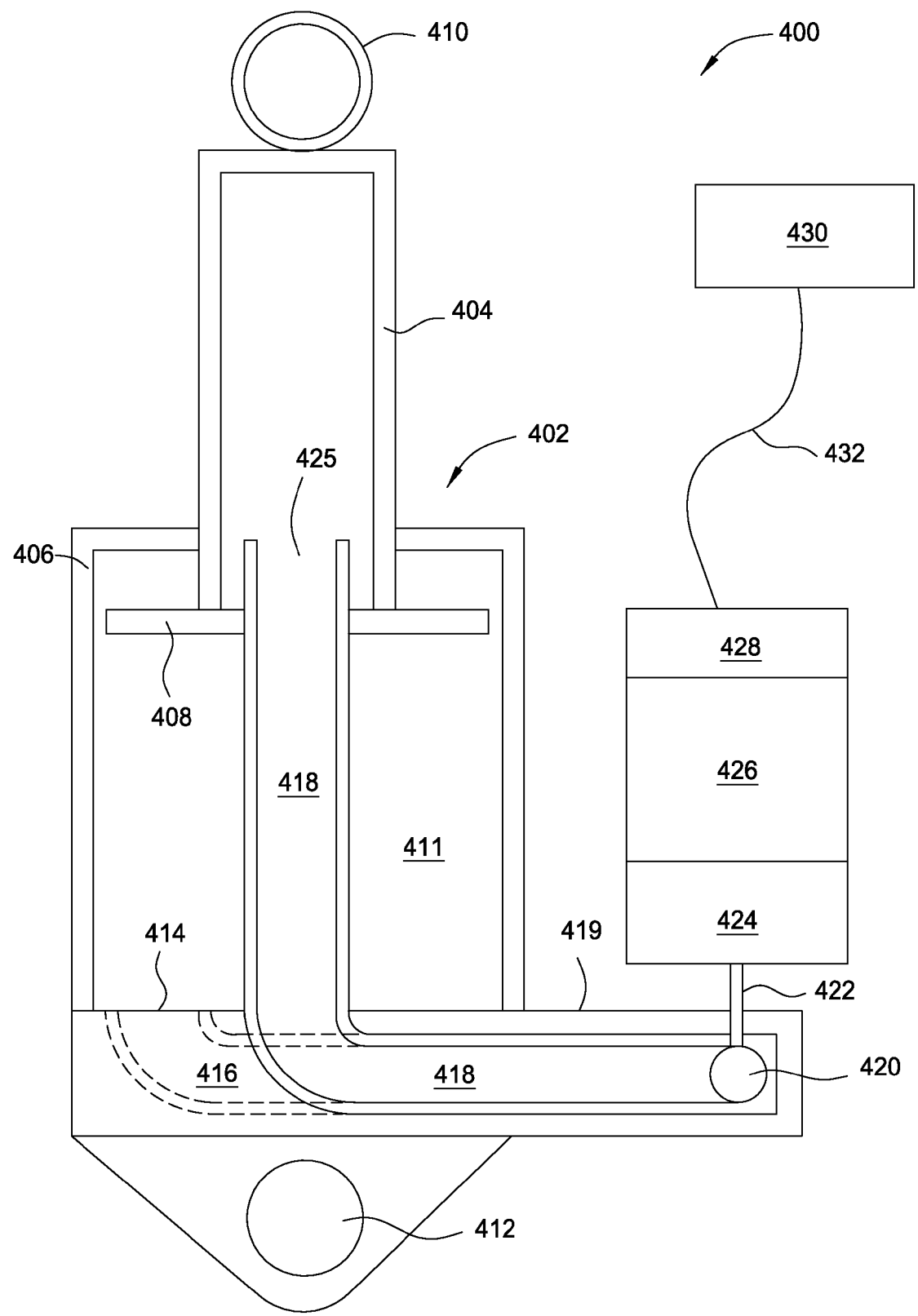
FIG. 4A is a cross-sectional view of an embodiment of an active landing gear damper in an extended position.
Figure 4B:
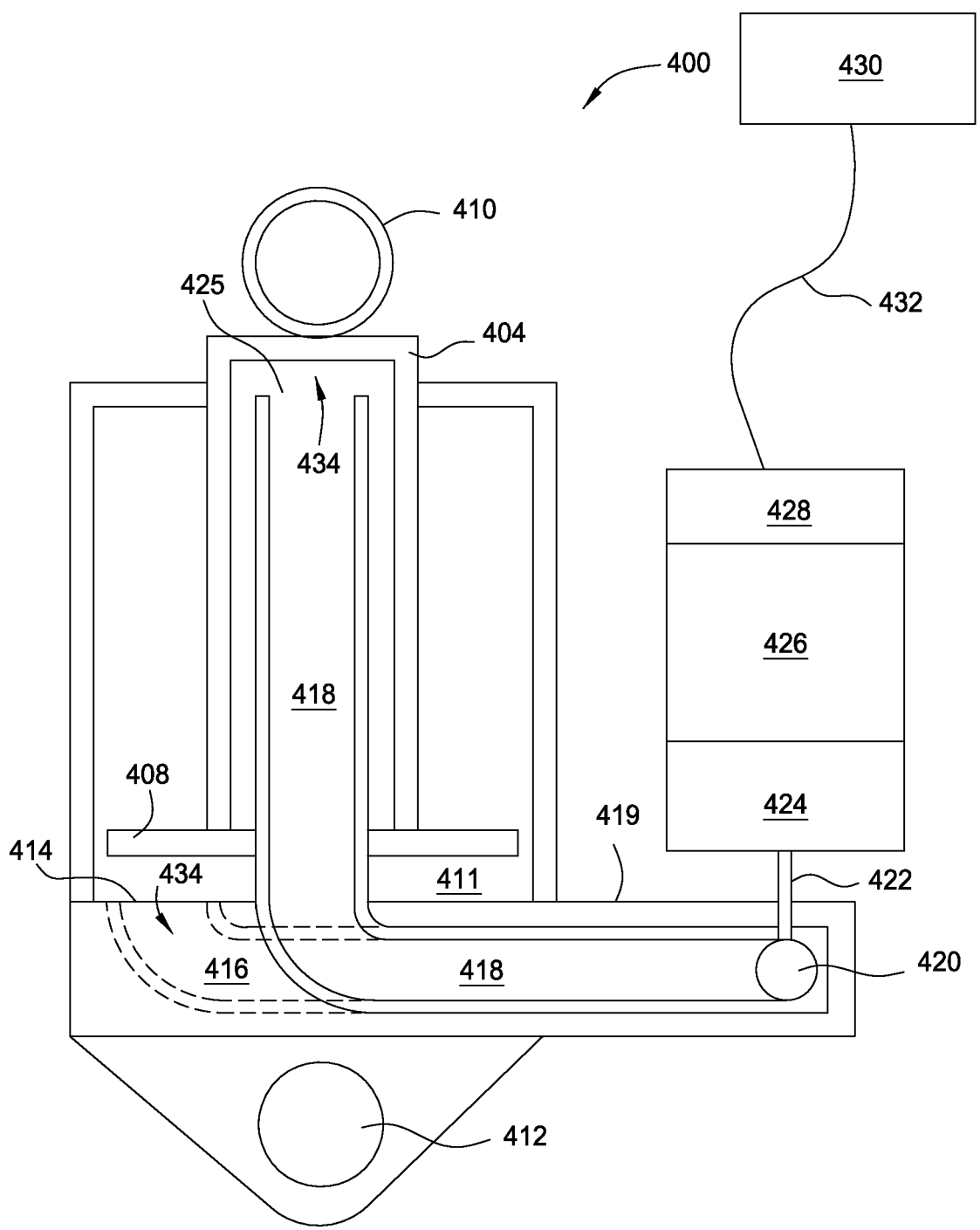
FIG. 4B is a cross-sectional view of the active landing gear damper of FIG. 4A in a contract position.
Figure 4C:
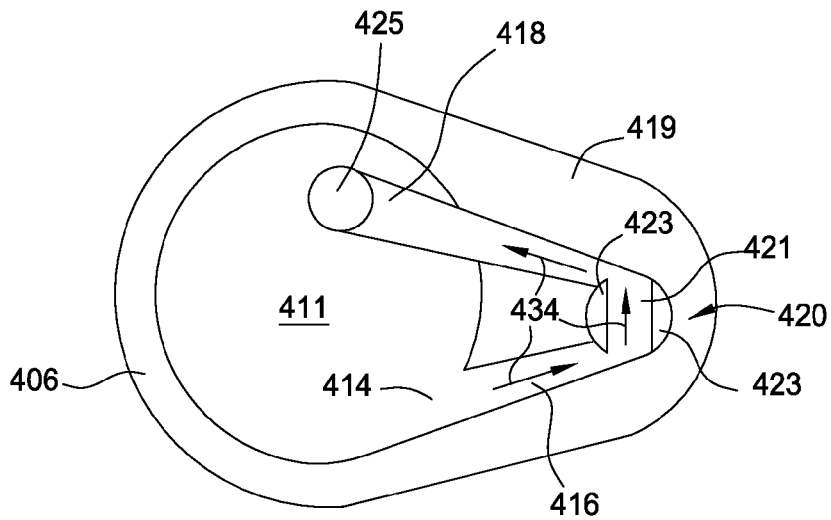
FIG. 4C is a cross-sectional view of a channel housing of the active landing gear damper of FIG. 4A, wherein a valve arranged in a channel is in a fully open position.
Figure 4D:
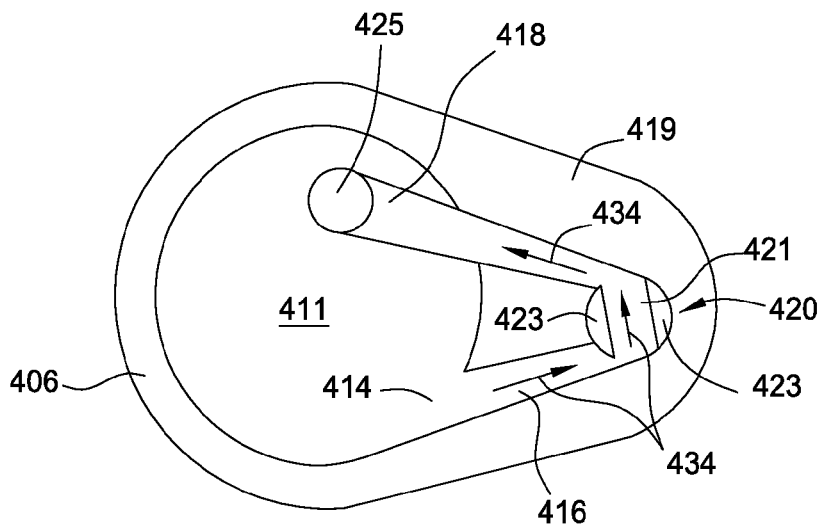
FIG. 4D is the cross-sectional view of the channel housing of FIG. 4C, wherein the valve arranged in the channel is in a partially open position.
Figure 4E:
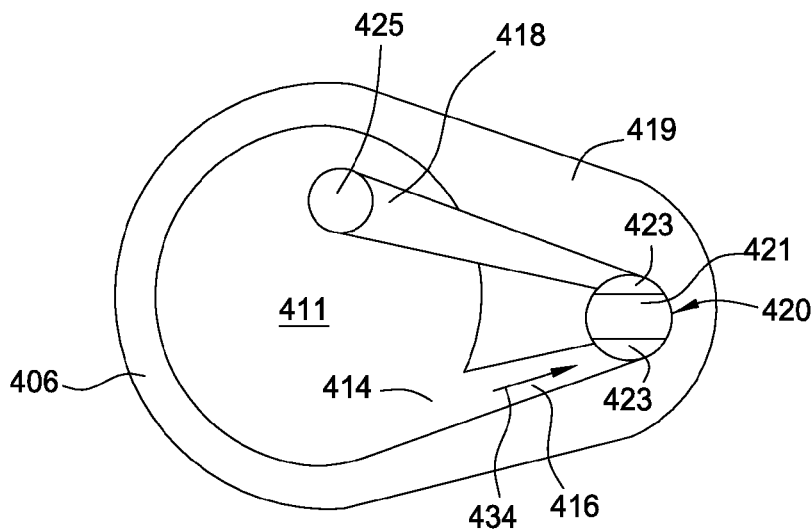
FIG. 4E is the cross-sectional view of the channel housing of FIG. 4C, wherein the valve arranged in the channel is in a fully closed position.

Referring now to FIGS. 4A-4E, embodiments of an adjustable damper 400 can include an adjustable valve 420 that varies the size of a restriction for damping fluid escaping a volume 411. Referring primarily to FIGS. 4A and 4B, embodiments of the damper 402 can include a cylinder 406 and a shaft 404. The shaft 404 can includes a first mount 410 arranged thereon, and the cylinder 406 can include a second mount 412 mounted thereon. The shaft 404 can be connected to a piston 408 arranged in the cylinder 406. The piston 408 and cylinder 406 can define a volume 411 filled with fluid (e.g. damping fluid). In various embodiments, the cylinder can be arranged on a housing 419. The housing 419 can define an inlet channel 416 and an outlet channel 418. The inlet channel 416 can be in communication with the volume 411 via an opening 414. Similarly, the outlet channel 418 can be in communication with a reservoir via an opening 425. The valve 420 can be arranged between the inlet channel 416 and the outlet channel 418. Referring now to FIGS. 4C-4E, the valve 420 can include walls 423 that define a channel 421 therebetween. The channel 421 in the valve 420 can be in communication with the inlet channel 416 and the outlet channel 418. Furthermore, the valve 420 is rotatable within the housing 419 to vary the amount of communication between the channel 421 of the valve and the inlet channel 416 and/or the outlet channel 418. FIG. 4C illustrates the valve 420 in its fully open position such that dampening fluid flow (depicted by arrow 434) can flow from the volume 411 through the inlet channel 416 to the outlet channel 418. FIG. 4D illustrates the valve 420 rotated to a partially open position in which the dampening fluid can still flow through the valve 420, but is restricted more than in FIG. 4C. FIG. 4E illustrates the valve 420 in a fully closed position wherein no fluid flow passes through the valve 420.

As the valve 420 moves from the fully-open position shown in FIG. 4C to the fully-closed position sown in FIG. 4E, the damping coefficient c for the adjustable damper increases. As the valve 420 reaches the fully-closed position, the damping coefficient c can approach infinity. The minimum damping coefficient c when the valve is in the fully-open position shown in FIG. 4C) can depend on the arrangement of the valve 420 relative to the volume 411. For example, referring to FIGS. 4A and 4B, the opening 414 to the inlet channel 416, the inlet channel 416, the outlet channel 418, and the valve 420 can each apply a restriction or resistance to flow of damping fluid from the volume 411, resulting in a minimum damping coefficient c when the valve is in the fully-open position shown in FIG. 4C. A look-up table of damping coefficient c values for different valve positions can be prepared through operation of an adjustable damper 400 at different valve 420 positions.

Referring again to FIGS. 4A and 4B, the valve 420 can be connected to a first end of a shaft 422. A second end of the shaft 422 can be connected to an output of a gearbox 424. The gearbox 424 can be driven by a motor 426 (e.g., a continuously adjustable electric, hydraulic, or pneumatic servo motor). The motor 426 can be continuously adjustable such that it can be driven to any particular rotational position (e.g., number of turns or fractions of turns). The gearbox 424 can multiply the torque provided by the motor 426, thereby allowing a smaller motor to be used. Furthermore, the gearbox 424 can protect the motor 426 from being back driven by the valve 420 (i.e., fluid passing through the valve 420 may exert a force on the valve 420 that would cause the valve 420 to turn toward a more open or more closed position). The gearbox 424 can provide resistance to the valve 420 being turned that the flowing fluid cannot overcome.

The motor 426 can also be connected to an encoder 428 that can track and report a rotational position (e.g., a number of turns of the motor from a starting position) of the motor 426. The motor 426 and encoder 428 can be connected to a damper controller 430 via a communication line 432. In certain embodiments, the damper controller 430 can be integral with the encoder 428. In such embodiments, each damper 402 can include a damper controller 430. In various other embodiments, a central damper controller 430 can communicate with and control the encoders 428 and motors 426 of each damper 402 of respective landing gear for an aircraft. The damper controller 430 can translate the reported rotational position of the motor into a rotational position of the valve.

Figure 5A:
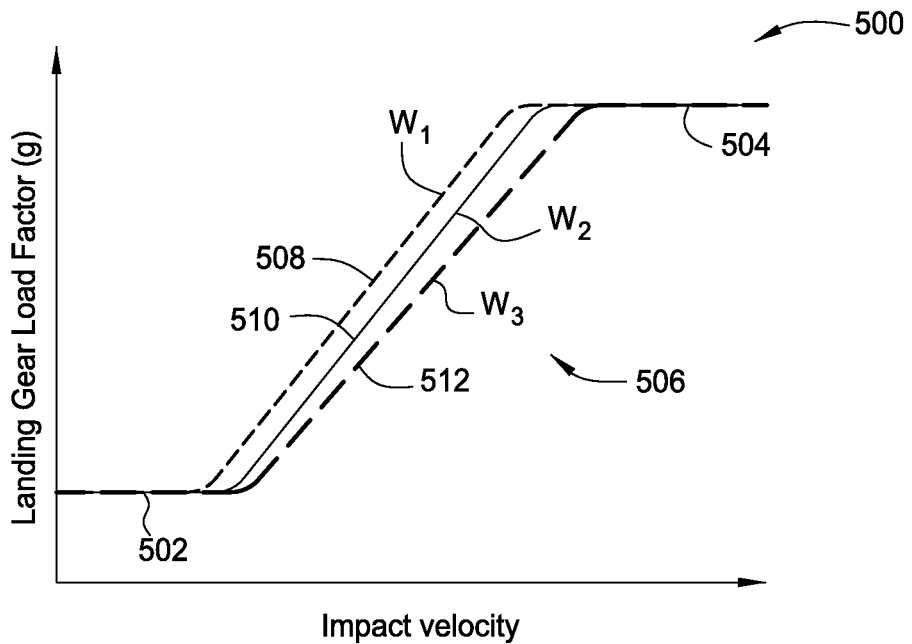
FIG. 5A is a graph illustrating exemplary landing gear load factors for different aircraft weights and at different impact velocities.
Figure 5B:
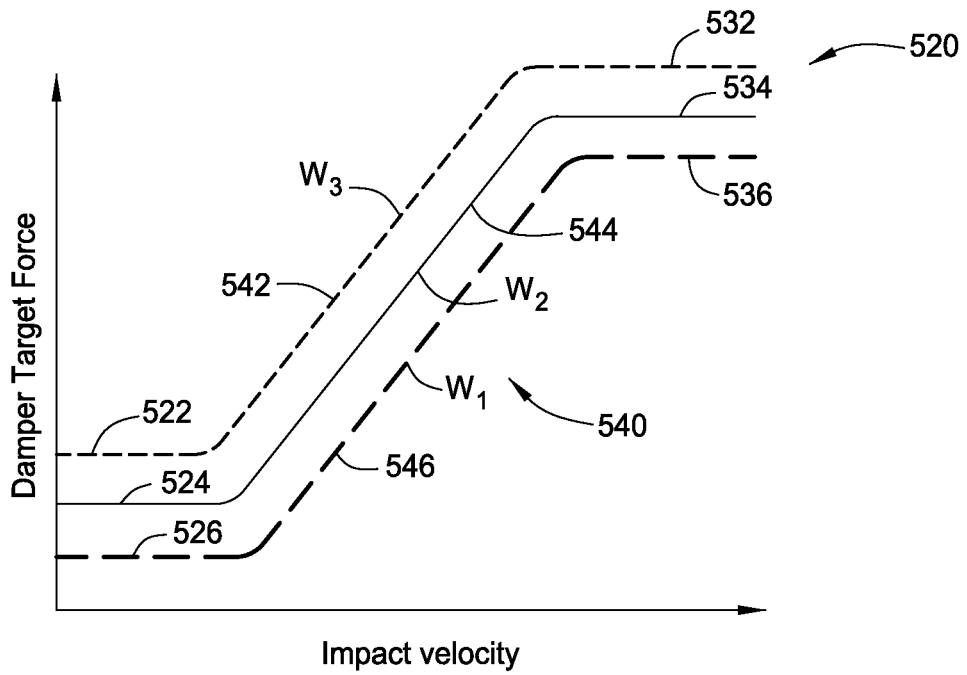
FIG. 5B is a graph illustrating exemplary landing gear damper target forces for different aircraft weights and at different impact velocities.

Referring now to FIGS. 5A and 5B, a particular aircraft can have an optimal landing gear load factor g (i.e., deceleration or "g" force) for its landing gear for a given impact velocity. FIG. 5A illustrates an exemplary graph 500 showing optimal load factors for landing gear as impact velocity increases for an aircraft at different weights $W_1$, $W_2$, and $W_3$ (wherein $W_2$ is heavier than $W_1$ and $W_3$ is heavier than $W_2$). The landing gear load factor g is an amount of deceleration (in multiples of gravity g) that the landing gear imparts on the aircraft when the aircraft impacts the ground at a particular velocity. The load factor (g) is derived from the equation:

$$F = m \cdot g; \qquad (2)$$

where F equals the force being exerted on the aircraft by the landing gear (e.g., by the landing gear damper), m equals the portion of mass of the aircraft on the landing gear, and g is the acceleration (i.e., deceleration) of the aircraft. Equation (2) can be reorganized as:

$$g = \frac{F}{m}. \qquad (3)$$

The exemplary graph 500 shows that a minimum landing gear load factor g may be optimal at relatively low impact velocities. For example, at low impact velocities (e.g., impact velocities experienced during a normal landing), a landing gear load factor g of two times gravity (i.e., 2 g's) may be sufficient to prevent the landing gear from fully compressing. Similarly, there can be a maximum landing gear load factor g for the landing gear. For example, the landing gear mounts (the locations where the landing gear is attached to the airframe) may break if subjected to loads above six g's. Thus, the load (for that particular landing gear) should not exceed six g's.

FIG. 5A also shows that, at a particular impact velocity, the landing gear load factor g decreases as an aircraft gets heavier. For example, at a given impact velocity, a medium weight $W_2$ aircraft (depicted by curve 510) will have a lower landing gear load factor than a light weight $W_1$ aircraft (depicted by curve 508). Similarly, at a given impact velocity, a heavy weight $W_3$ aircraft (depicted by curve 512) will have a lower landing gear load factor g than the medium weight $W_2$ aircraft or the light weight $W_1$ aircraft. The landing gear load factor g decreases as weight increases for a given impact velocity because the damper force at the given impact velocity is the same but must decelerate a heavier aircraft.

Referring now to FIG. 5B, to provide the same load factor g to an aircraft at any weight for an impact at a given speed, the force F being exerted on the aircraft by the landing gear must be increased as the aircraft weight increases. The graph 520 of FIG. 5B shows that the medium weight $W_2$ aircraft (depicted by curve 544) has a higher target damper force than the light weight $W_1$ aircraft (depicted by curve 546). Similarly, the heavy weight $W_3$ aircraft (depicted by curve 542) has a higher target damper force than the medium weight $W_2$ aircraft or the light weight $W_1$ aircraft. Referring again to equation (1), the target damper force F at a given velocity can be changed by varying the damping coefficient c. Referring again to FIGS. 4A-4E, by measuring the damping coefficient c for the adjustable damper 400 resulting from different positions of the valve 420, a model of damping coefficients c for different positions of the valve 420 can be provided. For example, the damper controller 430 can include a lookup table that provides damping coefficients c for different positions of the valve 420.

Figure 6A:
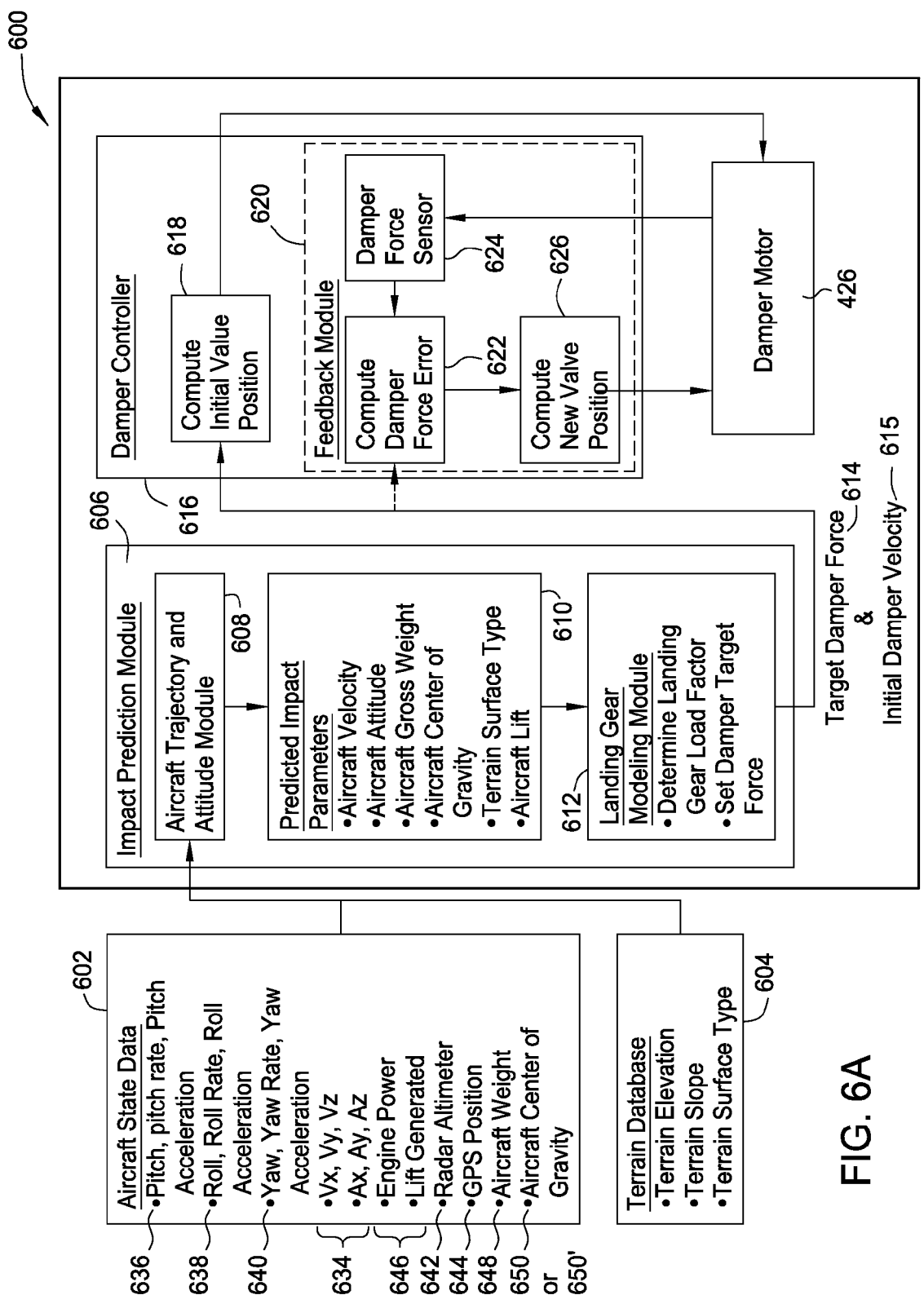
FIG. 6A is a block diagram illustrating components of a system for controlling an active landing gear damper and data used by the system.

Referring now to FIGS. 6A-6J, embodiments of a damping system can evaluate various aircraft data to predict an impact velocity for each landing gear of an aircraft and predict how much of the aircraft's weight will be supported by each landing gear. FIG. 6A is a block diagram of an exemplary damping system 600 that can receive at least one of various aircraft state data 602 and terrain information from a terrain database 604. The aircraft state data 602 (described in greater detail below) can be provided by various avionics and/or computers in the aircraft that can communicate with the damping system 600. Similarly, the terrain database 604 can be stored in avionics and/or computers in the aircraft that can communicate with the damping system 600.

An impact prediction module 606 of the damping system 600 can receive the aircraft state data 602 and terrain data from the terrain database 604 to predict the characteristics of an impending crash and to output to a damper controller 616 at least one of a target damper force 614 and a predicted initial damper velocity 615. The target damper force 614 corresponds to a damper force calculated to result in the desired land gear load factor g based on the portion of aircraft weight applied to a particular landing gear. The damper controller 616 uses the target damper force 614 and initial damper velocity 615 to set an initial valve position of the valve 420. After an impact has started, the damper controller 616 can continuously adjust the position of the valve 420 to achieve the desired damper force F. As an impact progresses and the aircraft decelerates, the damper velocity will slow. As a result, the damper force F and landing gear load factor g will decrease unless the valve 420 is rotated to a more closed position (thereby increasing the damping coefficient c). During an impact event, the damper controller 616 (and specifically the feedback module 620) can operate the motor 426 to rotate the valve to increase the damping coefficient c to maintain the damping force F at the target damper force 614. The target damper force 614 can also be transferred to a damper force difference module 622 within the feedback module 620. The damper force difference module 622 can compare the received target damper force 614 for a damper with the actual damper force being generated by the damper.

Referring again to the aircraft state data 602, the damping system 600 can receive various information about the operation of the aircraft from aircraft sensors, avionics, and/or computers. FIGS. 6B-6F depict various aircraft state data that can be received by the damping system 600. For example, referring to FIG. 6D, various sensors and/or avionics on an aircraft 632 (e.g. helicopter) can provide information about at least one of the pitch, pitch rate, and pitch acceleration 636 of the aircraft. Referring to FIG. 6E, various sensors and/or avionics on the aircraft can provide information about at least one of the role, roll rate, and roll acceleration 638 of the aircraft. Referring to FIG. 6F, various sensors and/or avionics on the aircraft can provide information about at least one of the yaw, yaw rate, and yaw acceleration 640 of the aircraft. The pitch 636, roll 638, and/or yaw 640 information can be used to determine the aircraft's current attitude, and to predict its attitude, at some future time (e.g., a future time that corresponds with a predicted impact).

Referring to FIG. 6B, the aircraft's current position can be determined from a global positioning satellite (GPS) receiver 644 and/or from an inertial navigation system (INS). The aircraft's current position can also be determined from other navigation systems, such as Long Range Navigation (LORAN) systems, VHF Omni Directional Radio Range (VOR) navigation, and/or non-directional bearing (NDB) navigation. The aircraft's altitude relative to the ground (e.g., altitude above ground level (AGL)) can be determined from a number of sources. For example, the position received by the GPS receiver 644 can include an altitude above sea level. The altitude above sea level can also be determined from an altimeter onboard the aircraft. The aircraft position (determined above) can be used to retrieve terrain elevation information from the terrain database 604 for the terrain below the aircraft. The retrieved terrain elevation information can be subtracted from the aircraft altitude above sea level to determine the aircraft altitude above ground level. The aircraft's AGL can also be determined using a radar altimeter 642 on board the aircraft.

Still referring to FIG. 6B, various aircraft avionics and/or sensors can determine at least one of the aircraft's velocity and acceleration in three dimensions (e.g. $V_X$, $V_Y$, $V_Z$, $A_X$, $A_Y$, and $A_Z$) 634. For example, the avionics and/or sensors can include an attitude and heading reference system (AHRS) and/or a gyroscopic flight instrument system to determine the aircraft velocities and accelerations.

Referring to FIG. 6C, the aircraft state data 602 can also include information about at least one of the weight 648 of the aircraft 632 as well as the center of gravity (CG) of the aircraft 632. FIG. 6C depicts an exemplary aft CG 650 and an exemplary forward CG 650'. The weight 648 of the aircraft can be calculated throughout a flight by an aircraft computer. The computer can start with a known empty weight of the aircraft, a known fuel load and/or munitions load of the aircraft, and an estimated passenger weight of the aircraft. As an example, an aircraft flight plan may assume that each person on board the aircraft weighs two hundred pounds. If 5 people are on board the aircraft, then the estimated passenger weight for the aircraft would be 1,000 pounds. As the flight progresses and fuel is burned and/or munitions are discharged, the weight of the aircraft will decrease. The aircraft computer can track the amount of fuel and/or munitions used and decrease the calculated weight as the flight progresses.

The aircraft center of gravity can also be tracked by a computer onboard an aircraft 632 (e.g., helicopter). An aircraft can have a known empty weight center of gravity. Adding fuel, munitions, cargo, and/or passengers can cause the center of gravity to shift forward or aft depending on the their placement in the aircraft. Items like fuel and munitions often have a known affect on the center of gravity because fuel is stored in defined, unmovable tanks and weapons are often arranged on defined, unmovable mounting points on the aircraft. Therefore, adjustments to the center of gravity for the fuel weight and/or munitions weight can be automatically performed based on the weights alone. Similarly, as fuel and/or munitions are used, the computer can automatically recalculate the center of gravity by removing the weights of the spent fuel and/or munitions. By contrast, cargo and/or passengers may be loaded into an aircraft in various configurations. As a result, the computer may require a weight and a placement location of passengers and/or cargo to calculate the center of gravity.

In various embodiments, the aircraft may calculate the center of gravity based on straight and level flight performance of the aircraft. For example, an aircraft may require more "nose down" control input for an aircraft with an aft CG 650 than an aircraft with a forward CG 650'. The aircraft may calculate the center of gravity based on control inputs during steady state flight and correlating the control inputs to a particular center of gravity.

In various embodiments, the aircraft state data 602 can also include information about lift being generated by the aircraft. In the example shown in FIG. 6C, a helicopter generates lift 646 from its spinning rotor blades. The amount of lift 646 being generated can be calculated and/or estimated by monitoring engine power, rotor shaft load, and/or rotor torque, for example. For a fixed wing aircraft (e.g. aircraft 112 shown in FIG. 1B), the amount of lift 646 being generated can be calculated and/or estimated by monitoring airspeed and angle of attack, for example.

The damping system 600 can also receive terrain information from a terrain database 604. In various embodiments, the terrain database 604 can be stored onboard the aircraft in a computer storage medium, for example. In various other embodiments, the terrain database 604 can be stored at a ground-based location and portions of the terrain database 604 can be transmitted and/or uploaded to the aircraft 632. For example, portions of the terrain database 604 corresponding to the position of the aircraft 632 can be transmitted and stored locally in a computer system of the aircraft 632. As another example, portions of the terrain database 604 that are relevant to a particular flight of the aircraft 632 may be uploaded and stored locally in a computer system of the aircraft 632. The terrain database 604 can include information about at least one of terrain elevation, slope, and surface type. The information can be keyed to location (e.g., latitude and longitude) such that the damping system 600 can access terrain information proximate to the current position of the aircraft.

The impact prediction module 606 of the damping system 600 can include an aircraft trajectory and attitude module 608. The aircraft trajectory and attitude module 608 can receive the aircraft state data 602 as well as information from the terrain database 604. The aircraft trajectory and attitude module can use the aircraft state data 602 and terrain database 604 information to predict whether an impact event is imminent. For example, in various embodiments, the aircraft trajectory and attitude module can use the velocities $V_X$, $V_Y$, and $V_Z$ to calculate the present velocity vector of the aircraft (i.e., the current aircraft travel direction) and can use the accelerations $A_X$, $A_Y$, and $A_Z$ to predict changes to the current velocity vector. From the velocity vector and accelerations, the aircraft trajectory and attitude module 608 of the damping system 600 can predict the trajectory 652 of the aircraft 632 and determine whether the aircraft will impact terrain.

In various embodiments, the damping system 600 can compare different aircraft state data 602 and/or terrain information to determine whether a crash is imminent. For example, the helicopter depicted in FIGS. 6B-6J may be flying straight and level over relatively flat terrain when it flies relatively close to and over the top of a skyscraper. In such an instance, the radar altimeter 642 may indicate a rapid decrease in altitude above ground level (e.g., the top of the skyscraper). However, other altitude data (e.g., received from an aircraft altimeter and/or a GPS receiver 644) and terrain information from the terrain database 604 may be used to contradict the radar altimeter 642 reading.

In the event that the aircraft trajectory and attitude module 608 predicts an impending impact with terrain, the module 608 can output predicted impact parameters 610. The predicted impact parameters can include at least one of the aircraft impact velocity (i.e., the vertical speed with which the aircraft will impact the terrain 654), the aircraft attitude with which the aircraft will impact the terrain 654, the aircraft gross weight at the time of impact, the aircraft's center of gravity at the time of impact, and the terrain surface type. In various embodiments, the predicted impact parameters can also include the lift 646 being generated by the aircraft 632.

The first parameter, aircraft velocity at the time of impact, can affect the force generated by dampers in the landing gear. In certain embodiments, the aircraft velocity can be a component of the aircraft velocity that is perpendicular to terrain. For a wheeled aircraft impacting level terrain, the downward component of the velocity of the aircraft can determine the magnitude of the impact energy and the initial speed of the dampers. If the aircraft impacts upward-sloping or downward-sloping terrain, then the forward component of the aircraft can increase or decrease, respectively, the magnitude of the impact energy and the initial speed of the dampers.

Figure 6G:
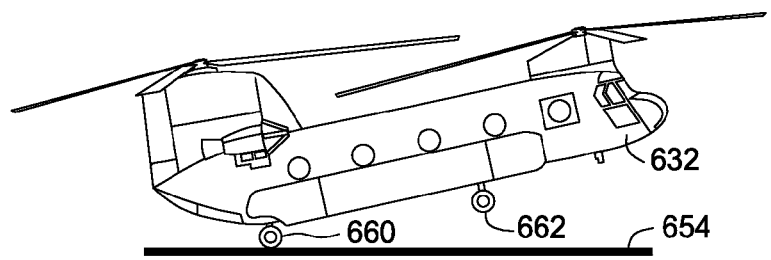
FIG. 6G illustrates the exemplary helicopter of FIG. 6C impacting terrain in a nose-high attitude.
Figure 6H:
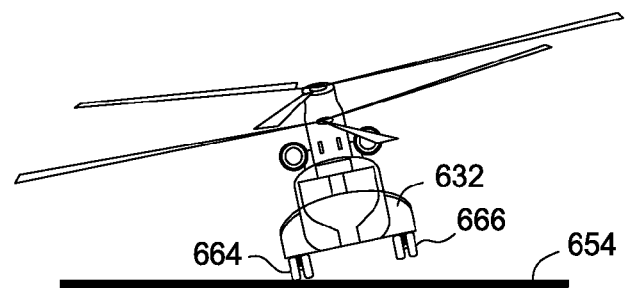
FIG. 6H illustrates the exemplary helicopter of FIG. 6C impacting terrain in a rolled attitude.
Figure 6I:
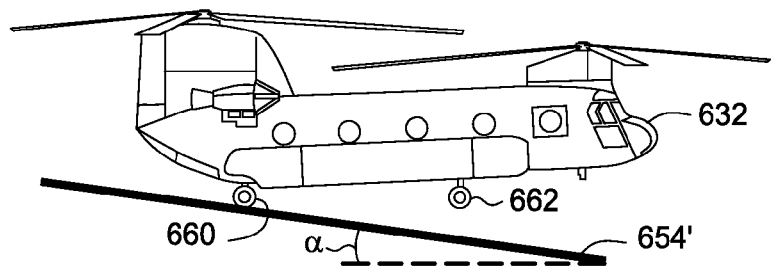
FIG. 6I illustrates the exemplary helicopter of FIG. 6C impacting sloped terrain.
Figure 6J:
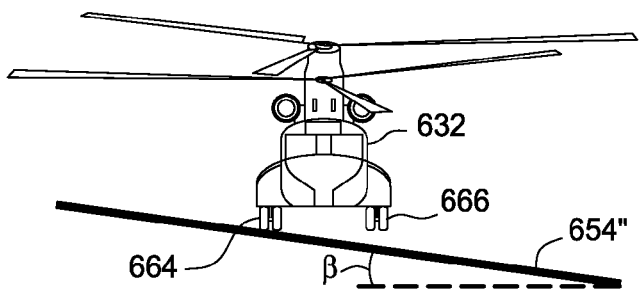
FIG. 6J illustrates the exemplary helicopter of FIG. 6C impacting sloped terrain.

Referring primarily to FIGS. 6G-6J, the aircraft's attitude at the time of impact relative to the terrain 654 can affect how much load may be applied to each landing gear of the aircraft. For example, FIG. 6G illustrates the aircraft 632 impacting the terrain 654 with a nose up attitude. Consequently, landing gear 660 will impact the terrain before landing gear 662 impacts the terrain 654. As a result, landing gear 660 may have a larger load applied to it than landing gear 662. As another example, FIG. 6H illustrates the aircraft 632 impacting the terrain 654, in a rolled attitude. Consequently, landing gear 664 impacts the terrain 654 before landing gear 666 impacts the terrain 654. As a result, landing gear 664 may have a larger load applied to it than landing gear 666. The terrain 654 at the location of impact may have a slope, and the slope of the terrain 654 can contribute to uneven loading of the different landing gear of the aircraft. For example, FIG. 6I illustrates the aircraft 632 impacting the terrain 654' in a level attitude, but the terrain 654' is arranged at a slope with an angle of α. Consequently, the landing gear 660 may impact the terrain 654' before landing gear 662 impacts the terrain 654'. As a result, landing gear 660 may have a larger load applied to it than landing gear 662. As another example, FIG. 6J illustrates the aircraft 632 impacting the terrain 654" in a level attitude, but the terrain 654" is arranged at a slope with an angle of β. Consequently, landing gear 664 may impact the terrain 654" before landing gear 666 impacts the terrain 654". As a result, landing gear 664 may have a larger load applied to it than landing gear 666.

The calculated weight of the aircraft and center of gravity of the aircraft (discussed above) can also affect the amount of load applied to each of the landing gear of the aircraft in an impact. As discussed above, the landing gear dampers must provide a larger damper force to a heavy aircraft than to a light aircraft to achieve the same landing gear load factor g. The center of gravity of the aircraft can affect a distribution of the weight of the aircraft on the landing gear upon impact with terrain 654. For example, referring primarily to FIG. 6C, if the aircraft 632 has an aft center of gravity 650, then landing gear 660 may have a larger portion of the overall weight of the aircraft 632 applied to it than landing gear 662. Conversely, if the helicopter has a forward center of gravity 650', then landing gear 662 may have a larger portion of the overall weight of the aircraft 632 applied to it than landing gear 660.

The terrain surface type of the terrain 654 can also affect the damper forces applied to the aircraft during an impact. As described above, the landing gear may at least partially sink into soft terrain surfaces such as sand, mud, or marsh. By comparison, the landing gear may not sink at all into hard soil, rock, or asphalt (e.g., a runway). As described above, if the landing gear sinks into the terrain upon impact, then the initial velocity of the dampers at the moment of impact may be slower than if the landing gear does not sink into the terrain. The terrain surface type can include a factor that can be used to estimate the speed of the landing gear as it sinks into the terrain. For example, the factor may vary between zero and one, a factor of zero can mean that that the surface is hard (e.g., asphalt) and the landing gear will not sink into the surface. By contrast, water may have a factor of one, meaning that the landing gear will sink into the water at the same velocity as the remainder of the aircraft. Sand, for example, may have a factor of 0.5, meaning that at the time of impact, the landing gear will sink into the sand at a velocity that is half of the velocity of the remainder of the aircraft. The values described above are illustrative only. The values of the factor may depend, among other reasons, on the type of landing gear and also the speed of impact. For example, a tire on a landing gear model may sink into snow-covered surface at a different rate than a landing gear equipped with a ski. Also, the amount of resistance a surface applies to the landing gear sinking in may change with impact speed. For example, at low speeds, water may provide almost no resistance to landing gear sinking into the water surface. However, at higher speeds, the amount of resistance by water to the landing gear can increase.

As discussed above, the impact parameters 610 can optionally include the lift 646 being generated by an aircraft at the time of impact with the terrain 654. The lift 646 can affect the loads on the landing gear (e.g. landing gear 660 and 662) upon impact. For example, the aircraft 632 depicted in FIGS. 6B-6J may be generating lift 646 equal to two times the weight of the helicopter at the time of impact. In this example, the lift 646 is not sufficient to prevent the aircraft from impacting terrain 654. However, upon impact, the lift 646 can mitigate some of the load that would otherwise be borne by the landing gear (e.g. landing gear 660 and 662).

Referring again to FIG. 6A, the predicted impact parameters 610 can be forwarded to a landing gear modeling module 612. The landing gear modeling module 612 can use the predicted impact parameters 610 to determine a landing gear load factor g for each landing gear of the aircraft. Referring again to FIG. 5A, the landing gear load factor g can be an optimal deceleration provided by a landing gear based on the predicted impact velocity. The landing gear modeling module 612 can then calculate a target damper force 614 for each landing gear of the aircraft based on the determined landing gear load factors g for the respective landing gear and based on the portion of the weight of the aircraft predicted to be supported by each landing gear upon impact.

The landing gear modeling module 612 can also output a predicted initial damper velocity 615 for each landing gear. The predicted initial damper velocity 615 is the predicted speed that the 2 ends of a landing gear damper will move towards one another at the instant of impact (e.g., see velocity V in FIG. 3B). For a number of reasons, the predicted initial damper velocity 615 can differ from the impact velocity of the aircraft. First, as described above, the landing gear may at least partially sink into the terrain 654, which may slow the initial damper velocity 615. The landing gear modeling module 612 can predict any effect on the predicted initial damper velocity 615 from soft terrain based on the terrain surface type information received in the predicted impact parameters 610. Second, the landing gear geometry may affect the predicted initial damper velocity 615 relative to the aircraft velocity. For example, referring to FIG. 2, when the landing gear structure 200 contacts the terrain 106, the aircraft frame 202 may move downwardly toward the axle 212 (the second link 206 and axle 212 will rotate about pivot 208). The damper 214, which is mounted to the aircraft frame 202 via a first pivot joint 220 and to the second link 206 via a second pivot joint 222, can compress as the aircraft frame 202 moves toward the axle 212. However, the damper 214 will compress at a slower rate than the aircraft frame 202 moves toward the axle 212 because the damper 214 is located inboard of the axle 212 relative to the pivot 208. Thus, in the example shown in FIG. 2, the initial damper velocity may be less than the aircraft impact velocity. Any difference between the predicted aircraft impact velocity and the predicted initial damper velocity 615 due to geometry differences will be landing gear design specific and can be preprogrammed into the landing gear modeling module.

Referring again to FIG. 6A, at least one of the target damper force 614 and predicted initial damper velocity 615 can be transmitted to a damper controller 616. As explained above, in various embodiments, each landing gear damper can include a separate damper controller 616. In such embodiments, the impact prediction module 606 can send a separate target damper force 614 to each damper controller 616. In various other embodiments, a central damper controller 616 can control the damper of each landing gear. In such embodiments, the impact prediction module 606 can send a damper target force signal that includes target damper force is 614 for each landing gear damper.

In the damper controller 616, at least one of the target damper force 614 and predicted initial damper velocity 615 can be used to calculate an initial valve position 618. Referring to equation (1) above, for each damper, the damping coefficient c can be determined based on the predicted initial damper velocity 615 that will result in the target damper force 614. The damper controller 616 can then use a lookup table or the like to determine a position of the valve (e.g., valve 420) that corresponds to the desired damping coefficient c. The damper controller 616 can then drive the motor 426 of each damper until the encoder 428 reports that the valve (e.g., valve 420) is properly positioned.

The impact prediction module 606 can also output the target damper force 614 to a feedback module 620 inside the damper controller 616. After the landing gear impacts the terrain 654, the feedback module of the damper controller 616 can control the motor 426 to vary the valve position to maintain the target damper force 614 as the landing gear compresses. The feedback module 620 can include a damper force sensor 624. The damper force sensor 624 may be a strain gauge and/or a load cell that directly measures force. Alternatively, the damper force sensor 624 can derive the damper force. For example, the damper force sensor 624 can be a linear encoder that measures the position of the damper piston relative to the cylinder. By measuring the position of the damper piston at regular time intervals, a piston velocity can be calculated. Then, knowing the valve 420 position and the calculated piston velocity enables a calculation of damper force. The feedback module 620 compares the actual damper force (measured by damper force sensor 624) to the target damper force 614 (at the damper force difference module 622) and computes a new valve position (see block 626) to reduce the error between the target damper force 614 and the actual damper force (measured by damper force sensor 624). In various embodiments, the feedback module 620 may be a proportional-integral-derivative (PID) controller.

In addition to minimizing any errors between the target damper force 614 and actual damper force (measured by damper force sensor 624), the feedback module 620 can also adjust the damper valve (e.g., valve 420) position (by operating the motor 426) to maintain the target damper force 614 as the damper velocity slows down. Referring again to FIGS. 5A and 5B, as the relative velocity of the damper ends toward one another decreases, the force generated by the damper also decreases. The feedback module 620 can adjust the valve to a more restrictive position. As a result, the damping coefficient c can be increased such that the actual damper force (measured by damper force sensor 624) remains approximately the same.

Figure 7:
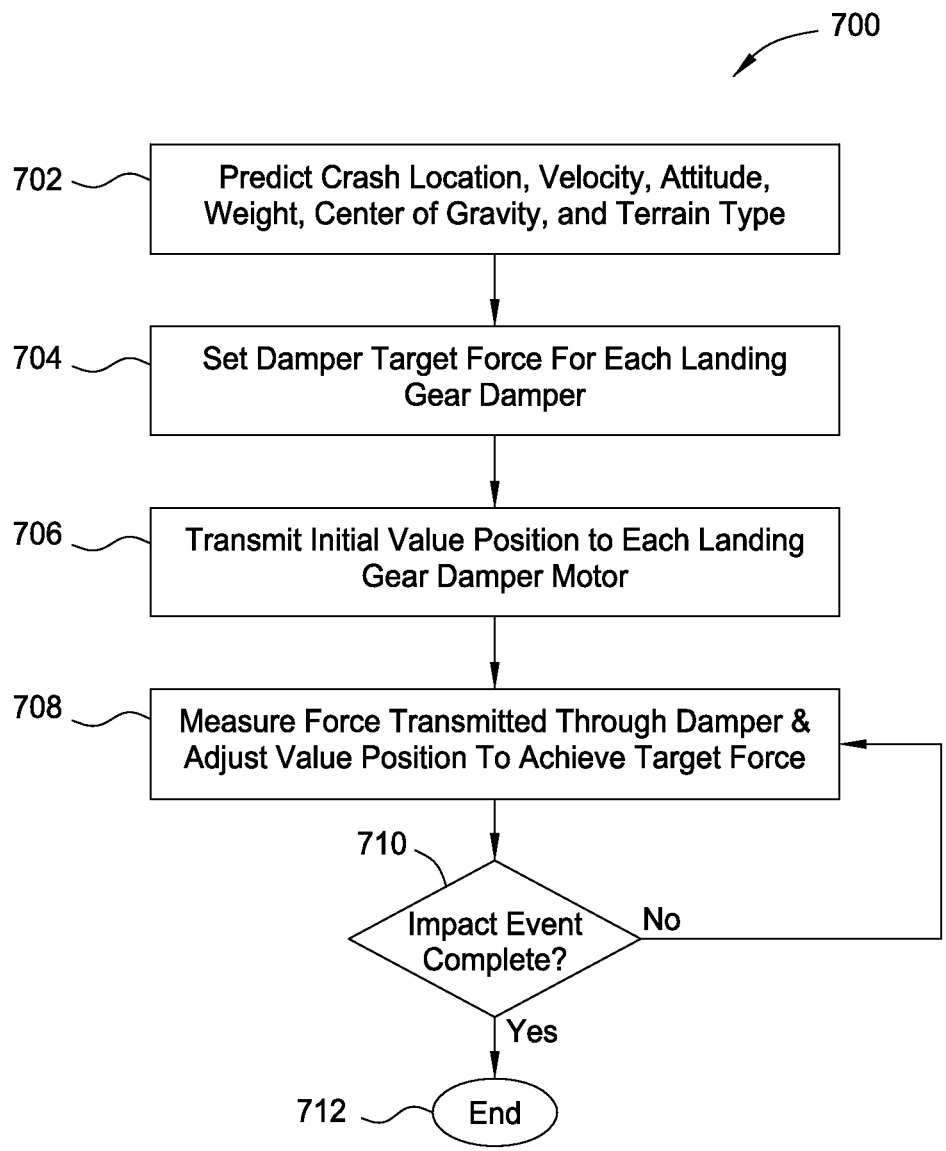
FIG. 7 illustrates a method for adjusting an adjustable damper for an impact.

Referring now to FIG. 7, a method 700 for damping an aircraft impact with terrain is shown. In block 702, a system can predict the location of an impact with terrain and also determine at least one of the impact velocity and the aircraft attitude at the time of the impact. The system can also predict at least one of the weight of the aircraft and the center of gravity of the aircraft at the time of impact. Also, using the terrain database, the system can determine the type of terrain the aircraft will impact (e.g., prepared surface, soil, and water). The types of terrain can include additional types (e.g., asphalt, dirt, sand, marsh, etc.).

In block 704, the system can set a target damper force for each landing gear of the aircraft based on the above parameters that will result in an optimal landing gear load factor G for each landing gear. At least one of the target damper force and a predicted initial damper velocity can be transmitted to a damper controller.

In block 706, the damper controller can receive at least one of the target damper force and predicted initial damper velocity and calculate a damping coefficient c, required to achieve the target damper force based on the initial damper velocity. The damper controller can use a lookup table or the like, to determine an initial valve position that corresponds to the calculated damping coefficient c.

Referring now to block 708, after impact, the damper controller can continuously measure the actual damper force (e.g., via a load cell, strain gauge, or the like) and compare the actual damper force to the target damper force. In various embodiments, the damper controller can continuously measure the actual damper force. The controller can adjust the valve position to minimize the error between the actual damper force and the target damper force. In various embodiments, the controller can continuously adjust the valve position. The controller can also adjust the valve position to increase the damping coefficient c as the aircraft and the damper decelerate during the impact. In various embodiments, the controller continues to operate for as long as possible after an impact event begins. For example, a crash event may sever communication between the controller and the remainder of aircraft systems such that the controller may not be able to determine that a crash event has ended.

In various other embodiments, in block 710, the system checks to see if the impact event is complete. If not, then the method 700 returns to block 708 and continues to adjust the valve position to maintain the target force. The controller may determine whether an impact event is complete in a number of ways. For example, as described above, as an impact event progresses and the damper decelerates, the valve of the damper will be moved to the closed position to maintain the target damping force. In various embodiments, the controller can determine that the impact event is completed once the valve is fully closed. In various other embodiments, the controller may determine that an impact event is completed after the detected force (e.g., force detected by the force sensor) has not changed in a threshold time period (e.g., five seconds). If the controller determines that an impact event has ended, then the method 700 moves to block 712 and ends.

The systems and methods disclosed herein are not limited to aircraft. For example, various embodiments of the systems and methods can be applied to any vehicle suspension, such as automobiles, motorcycles, tanks, and trucks. For example, tanks can drive quickly over unimproved surfaces and can sometimes "jump" over bumps in the terrain. Various embodiments of the above-described system can be used to adjust the damping profile of the suspension of the tank when the tank lands after a "jump."

Embodiments of the system can also be used in non-impact situations. For example, helicopters can be susceptible to a hazardous known as ground resonance in which a vibration in the rotor can match a natural resonant frequency of the airframe in contact with the ground. Ground resonance can destroy a helicopter in a matter of seconds. Adjusting the adjustable dampers of the system may change the natural resonant frequency of the airframe and stop a ground resonance situation before the vibration amplifies and damages the helicopter.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer readable medium (including any of the media types described above), for example, that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A damper for a vehicle suspension system, the damper comprising:
    a cylinder defining a damper volume therein, wherein the cylinder is configured for connection to a first suspension component of the vehicle suspension system;
    a piston disposed in the cylinder, wherein the piston includes a shaft extending out of a first end of the cylinder, wherein the shaft is configured for connection to a second suspension component of the vehicle suspension system that is movable relative to the first suspension component, wherein the shaft includes a hollow region, and wherein the piston is movable within the cylinder;
    a housing arranged at a second opposing end of the cylinder, wherein a portion of the housing extends past a wall of the cylinder, wherein the housing defines a fluid channel with an inlet in fluid communication with the damper volume on a first side of the piston and an outlet in fluid communication with the damper volume on a second side of the piston, and wherein the outlet extends through an aperture in the piston and into the hollow region;
    an adjustable damper valve disposed in the fluid channel between the inlet and the outlet in the portion of the housing, wherein the damper valve defines a valve channel, wherein the valve channel is rotatable relative to the fluid channel to provide varying degrees of alignment between the fluid channel and the valve channel such that rotation of the damper valve changes a damping coefficient of the damper;

a motor, wherein operation of the motor adjusts the damper valve; and
a controller configured to:
receive a target damper force and initial damper velocity in response to a predicted vehicle impact;
in response to receiving the target damper force and initial damper velocity, operate the motor to adjust the damper valve to a position corresponding to a damping coefficient that results in the target damper force at the initial damper velocity; and
thereafter, operate the motor during vehicle impact to reduce any difference between an actual damping force of the damper and the target damping force.

2. The damper of claim 1, further comprising an impact prediction module configured to output the target damper force and initial damper velocity to the controller.

3. The damper of claim 2, wherein the impact prediction module receives at least one of vehicle state data and terrain information, wherein, in response to at least one of the received vehicle state data and terrain information, the impact prediction module predicts impact parameters that include at least one of:
a terrain surface type,
an aircraft impact velocity,
an impact attitude relative to the terrain at time of impact,
an aircraft gross weight at time of impact, and
an aircraft center of gravity at time of impact;
wherein the impact prediction module calculates the target damper force based on a target landing gear load factor and the predicted impact parameters, and wherein the impact prediction module calculates the initial damper velocity based on the predicted impact parameters.

4. The damper of claim 3, wherein the vehicle is an aircraft, and wherein the vehicle state data comprises at least one of:
pitch, pitch rate, and pitch acceleration data;
roll, roll rate, and roll acceleration data;
yaw, yaw rate, and yaw acceleration data;
a three-dimensional velocity vector;
a three-dimensional acceleration vector;
a position;
an altitude above ground level;
an aircraft weight; and
an aircraft center of gravity.

5. The damper of claim 3, wherein the terrain information comprises at least one of:
terrain elevation;
terrain slope; and
terrain surface type.

6. The damper of claim 3, wherein the impact parameters further comprise lift generated by the aircraft at the time of impact, and wherein the target damper force is reduced by the lift generated by the aircraft at the time of impact.

7. The damper of claim 1, wherein the motor comprises a continuously adjustable servomotor.

8. The damper of claim 1, further comprising a gearbox arranged between the motor and the adjustable valve, wherein the gearbox is configured to multiply torque from the motor and apply the multiplied torque to the adjustable valve.

9. The damper of claim 1, further comprising a gearbox arranged between the motor and the adjustable valve, wherein the gearbox is mounted to the portion of the housing extending past the wall of the cylinder, and wherein the gearbox is configured to multiply torque from the motor and apply the multiplied torque to the adjustable valve.

10. The damper of claim 1, wherein the shaft includes a hollow region, and wherein the outlet extends through an aperture in the piston.

11. A damper for an aircraft suspension system, the damper comprising:
a cylinder defining a damper volume therein, wherein the cylinder is configured for connection to a first suspension component of the vehicle suspension system;
a piston disposed in the cylinder, wherein the piston includes a shaft extending out of a first end of the cylinder, wherein the shaft is configured for connection to a second suspension component of the vehicle suspension system that is movable relative to the first suspension component, wherein the shaft includes a hollow region, and wherein the piston is movable within the cylinder;
a housing arranged at a second opposing end of the cylinder, wherein a portion of the housing extends past a wall of the cylinder, wherein the housing defines a fluid channel with an inlet in fluid communication with the damper volume on a first side of the piston and an outlet in fluid communication with the damper volume on a second side of the piston, and wherein the outlet extends through an aperture in the piston and into the hollow region;
an adjustable damper valve disposed in the fluid channel between the inlet and the outlet in the portion of the housing, wherein the damper valve defines a valve channel, wherein the valve channel is rotatable relative to the fluid channel to provide varying degrees of alignment between the fluid channel and the valve channel such that rotation of the damper valve changes a damping coefficient of the damper;
a motor, wherein operation of the motor adjusts the damper valve;
an impact prediction module configured to output a target damper force and initial damper velocity, wherein the impact prediction module predicts an amount of lift generated by the aircraft at the time of a predicted vehicle impact, and wherein the target damper force is reduced by an amount proportional to the lift generated by the aircraft; and
a controller configured to:
receive the target damper force and initial damper velocity in response to a predicted vehicle impact;
in response to receiving the target damper force and initial damper velocity, operate the motor to adjust the damper valve to a position corresponding to a damping coefficient that results in the target damper force at the initial damper velocity; and
thereafter, operate the motor during aircraft impact to reduce any difference between an actual damping force of the damper and the target damping force.

12. The damper of claim 11, wherein the impact prediction module receives at least one of vehicle state data and terrain information, wherein, in response to at least one of the received vehicle state data and terrain information, the impact prediction module predicts impact parameters that include at least one of:
a terrain surface type,
an aircraft impact velocity,
an impact attitude relative to the terrain at time of impact,
an aircraft gross weight at time of impact, and
an aircraft center of gravity at time of impact;
wherein the impact prediction module calculates the target damper force based on a target landing gear load factor and the predicted impact parameters, and wherein the impact prediction module calculates the initial damper velocity based on the predicted impact parameters.

13. The damper of claim 12, wherein the vehicle is an aircraft, and wherein the vehicle state data comprises at least one of:
pitch, pitch rate, and pitch acceleration data;
roll, roll rate, and roll acceleration data;
yaw, yaw rate, and yaw acceleration data;
a three-dimensional velocity vector;
a three-dimensional acceleration vector;
a position;
an altitude above ground level;
an aircraft weight; and
an aircraft center of gravity.

14. The damper of claim 12, wherein the terrain information comprises at least one of:
terrain elevation;
terrain slope; and
terrain surface type.

15. The damper of claim 11, wherein the motor comprises a continuously adjustable servomotor.

16. The damper of claim 11, further comprising a gearbox arranged between the motor and the adjustable valve, wherein the gearbox is configured to multiply torque from the motor and apply the multiplied torque to the adjustable valve.

17. A damper for a vehicle suspension system, wherein the vehicle suspension system comprises a plurality of landing gear, and wherein each landing gear comprises a damper, the damper comprising:
a cylinder defining a damper volume therein, wherein the cylinder is configured for connection to a first suspension component of the vehicle suspension system;
a piston disposed in the cylinder, wherein the piston includes a shaft extending out of a first end of the cylinder, wherein the shaft is configured for connection to a second suspension component of the vehicle suspension system that is movable relative to the first suspension component, wherein the shaft includes a hollow region, and wherein the piston is movable within the cylinder;
a housing arranged at a second opposing end of the cylinder, wherein a portion of the housing extends past a wall of the cylinder, wherein the housing defines a fluid channel with an inlet in fluid communication with the damper volume on a first side of the piston and an outlet in fluid communication with the damper volume on a second side of the piston, and wherein the outlet extends through an aperture in the piston and into the hollow region;
an adjustable damper valve disposed in the fluid channel between the inlet and the outlet in the portion of the housing, wherein the damper valve defines a valve channel, wherein the valve channel is rotatable relative to the fluid channel to provide varying degrees of alignment between the fluid channel and the valve channel such that rotation of the damper valve changes a damping coefficient of the damper;
a motor, wherein operation of the motor adjusts the damper valve;
an impact prediction module configured to output a target damper force and initial damper velocity, wherein the impact prediction module predicts a target damper force for a predicted impact based on a predicted distribution of impact forces on each of the plurality of landing gear; and
a controller configured to:
receive the target damper force and initial damper velocity in response to a predicted vehicle impact;
in response to receiving the target damper force and initial damper velocity, operate the motor to adjust the damper valve to a position corresponding to a damping coefficient that results in the target damper force at the initial damper velocity; and
thereafter, operate the motor during aircraft impact to reduce any difference between an actual damping force of the damper and the target damping force.

18. The damper of claim 17, wherein the impact prediction module receives at least one of vehicle state data and terrain information, wherein, in response to at least one of the received vehicle state data and terrain information, the impact prediction module predicts impact parameters that include at least one of:
a terrain surface type,
an aircraft impact velocity,
an impact attitude relative to the terrain at time of impact,
an aircraft gross weight at time of impact, and
an aircraft center of gravity at time of impact;
wherein the impact prediction module calculates the target damper force based on a target landing gear load factor and the predicted impact parameters, and wherein the impact prediction module calculates the initial damper velocity based on the predicted impact parameters.

19. The damper of claim 18, wherein the vehicle is an aircraft, and wherein the vehicle state data comprises at least one of:
pitch, pitch rate, and pitch acceleration data;
roll, roll rate, and roll acceleration data;
yaw, yaw rate, and yaw acceleration data;
a three-dimensional velocity vector;
a three-dimensional acceleration vector;
a position;
an altitude above ground level;
an aircraft weight; and
an aircraft center of gravity.

20. The damper of claim 18, wherein the terrain information comprises at least one of:
terrain elevation;
terrain slope; and
terrain surface type.

21. The damper of claim 17, wherein the motor comprises a continuously adjustable servomotor.

* * * * *